Sept. 15, 1942.   J. F. SCHWAN   2,295,917
HAY LOADER AND STACKER
Filed July 19, 1940   3 Sheets-Sheet 3
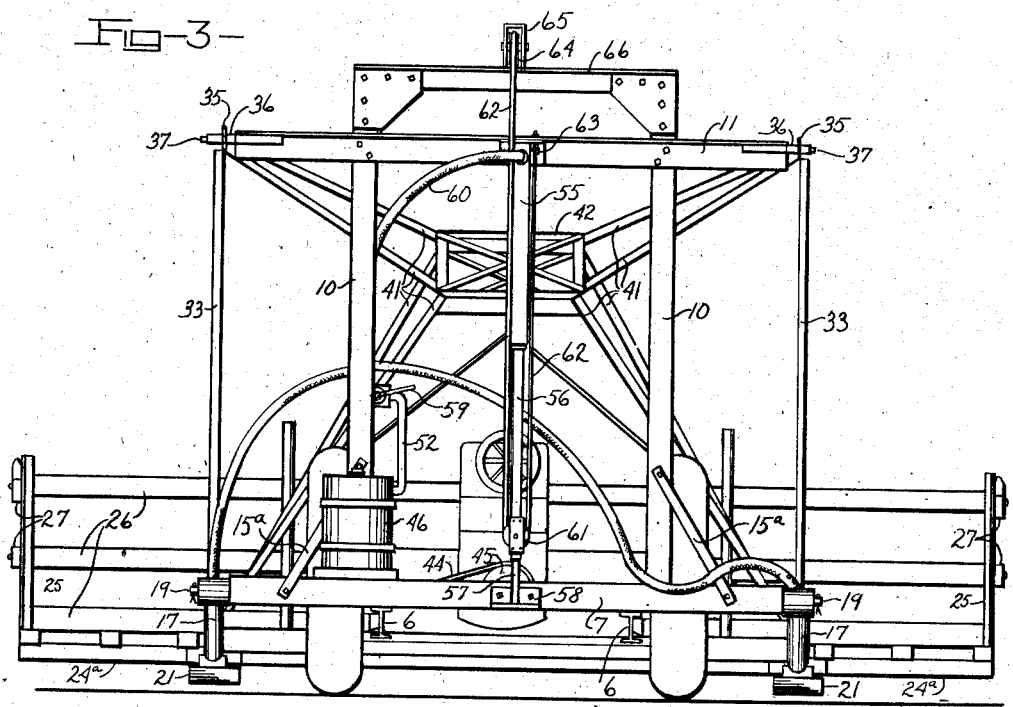
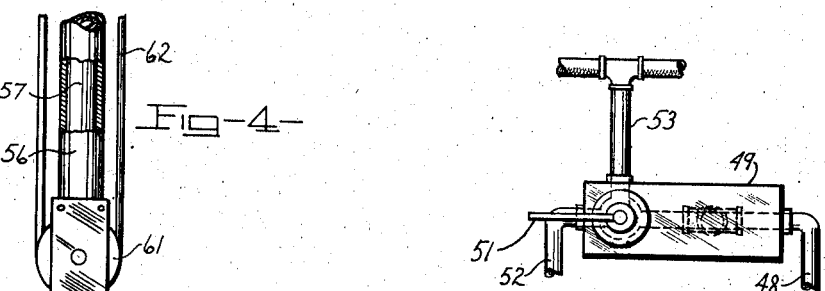
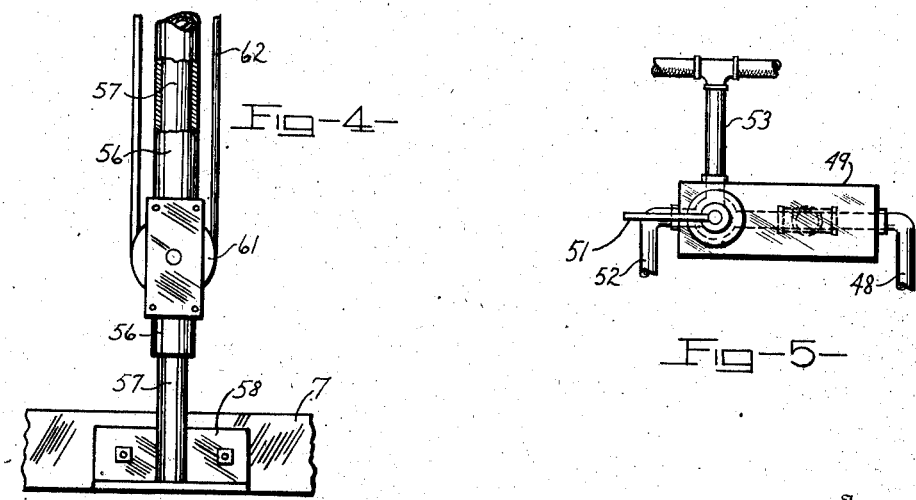
Inventor
JOSEPH F. SCHWAN.
By Carlsen & Hoyle
Attorneys Patented Sept. 15, 1942

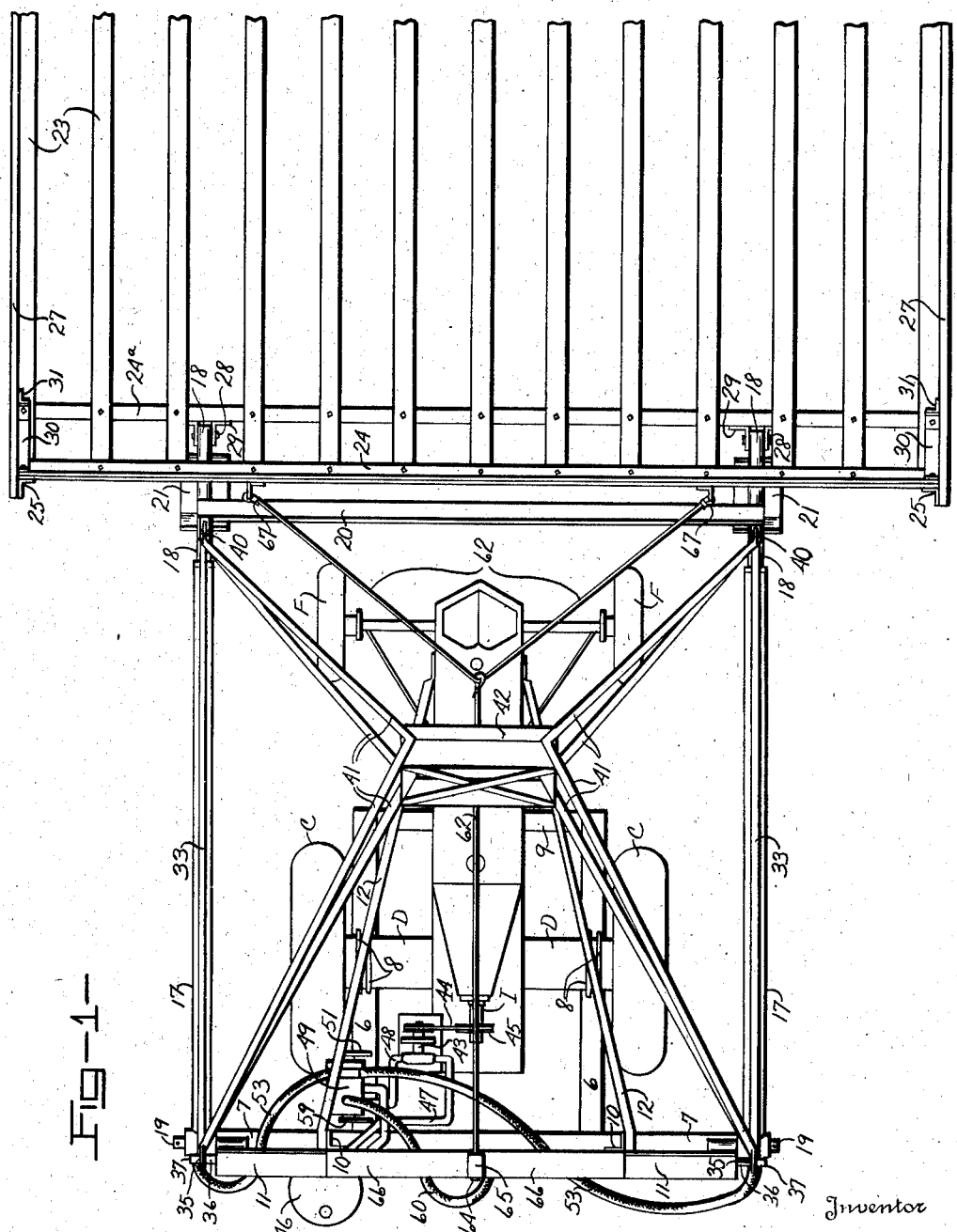

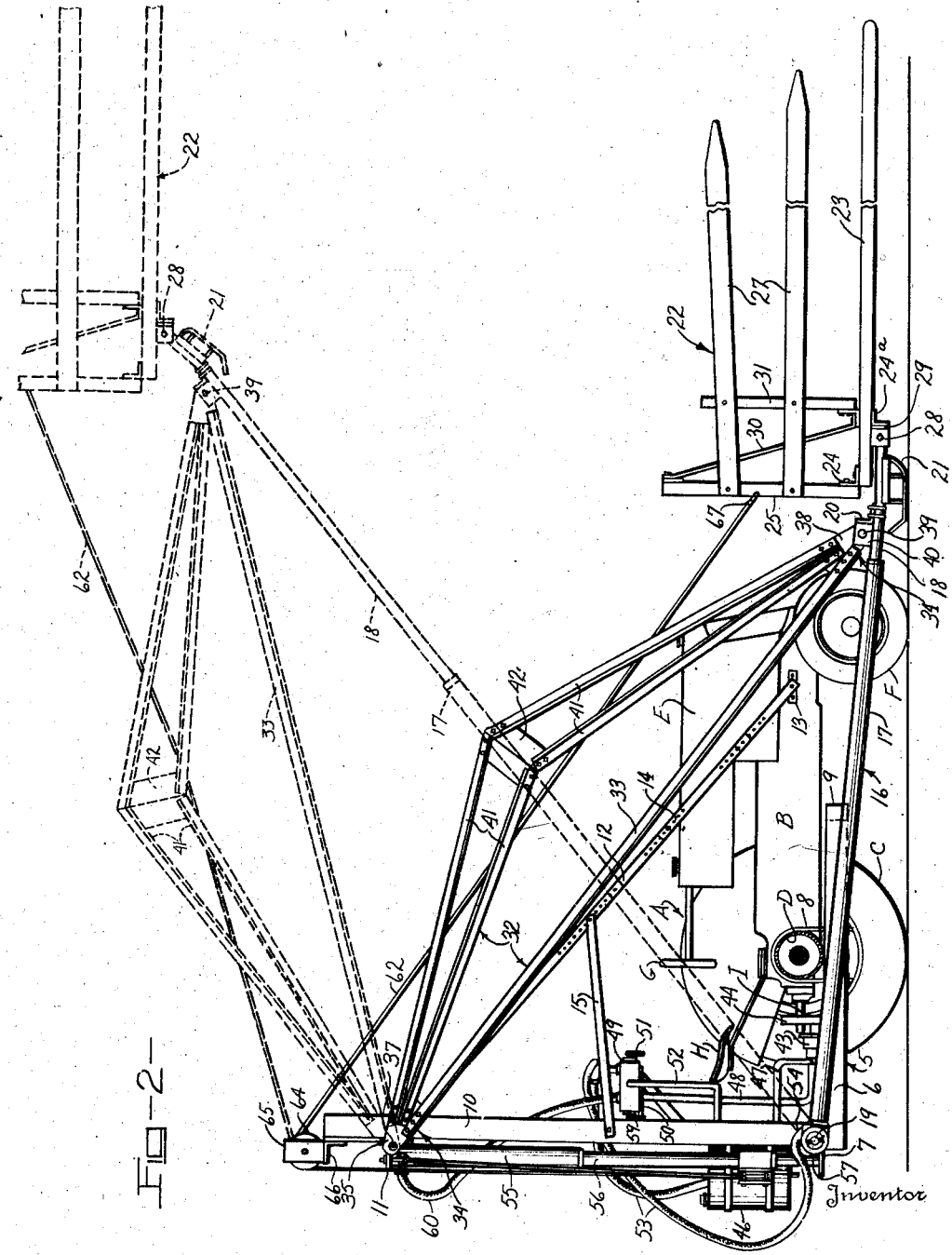

2,295,917

UNITED STATES PATENT OFFICE 2,295,917

HAY LOADER AND STACKER

Joseph F. Schwan, St. Paul, Minn.

Application July 19, 1940, Serial No. 346,353

12 Claims. (Cl. 214—141)

This invention relates to improvements in implements for picking up and stacking or loading hay and similar materials.

The primary object of the invention is to provide a machine or device for mounting upon a tractor and which will function to pick up the mown hay from the field, transport the load of hay and finally elevate and deposit the load on the stack or other desired place. Another object is to provide a device of this kind in which the operations of elevating the load and then depositing the load are easily and conveniently controlled by tractor powered hydraulically operating means. A further object is to provide a device of this nature which may be readily mounted upon or detached from the tractor, and which embodies means for conveniently controlling all of the operations necessary in its use from the driver's seat on the tractor. Still a further object is to provide a device of this kind having provision for a very high lift in order to elevate the load as may be necessary in the stacking operation.

These and other more detailed and specific objects will be disclosed in the course of the following specification, reference being had to the accompanying drawings, in which—

Fig. 1 is a plan view of my hay loader and stacker as mounted upon a tractor and with the load carrying parts lowered in position for raking up the hay.

Fig. 2 is a side elevation and also showing the parts in elevated positions in dotted lines.

Fig. 3 is a rear end elevation.

Fig. 4 is an enlarged detail sectional view of a lower portion of the tilting mechanism.

Fig. 5 is a detail end view of the control valve mechanism.

The device or implement forming the subject of my invention is supported upon and by a tractor represented generally at A in the drawings. This tractor may be of any conventional type or make, and my device of course may be altered in such minor details as may be necessary to fit it to the tractor at hand. As here shown the tractor includes the body or frame B supported by large rear traction wheels C which are mounted at the ends of rear axle housings D and which are driven in usual manner by the power unit at E. The dirigible front wheels F are controlled for steering purposes by the steering wheel G which is arranged adjacent to the operator's seat H. The tractor has the usual rearwardly extending power take-off shaft I of which use is made as will hereinafter appear.

In accordance with my invention a base frame 5 is supported at the rear of the tractor with rearwardly directed ends 6 spaced apart transversely to rigidly support a base cross member 7. As here shown the ends 6 are a part of longitudinal beams which extend below the rear axle housings D and are secured thereto as by U-bolts 8. A cross bar 9 rigidly joins forward ends of these beams and may be secured beneath the tractor frame B in any suitable manner. Uprights 10 are secured rigidly to cross member 7 in transversely spaced positions but inwardly of the outer ends of said member and an upper cross member 11 is rigidly supported transversely and horizontally adjacent the upper ends of the uprights. It will be noted that both upper and lower cross members are of such length that they extend well outward beyond the plane of the traction wheels C at each side and that the upper member 11 is supported at a considerable elevation above the tractor. The uprights 10 are rigidly braced by forwardly and downwardly directed brace bars 12 which are secured at forward ends at 13 to the tractor and have provision for length adjustment at 14 to properly line up the frame assembly. Tie bars 15 join the brace bars and uprights to impart further rigidity to the structure. The uprights are further transversely braced by bars 15a as shown in Fig. 3.

Laterally arranged and substantially longitudinally extending booms 16 are provided at each side and outwardly of the tractor, and these booms comprise the elongated tubular cylinders 17 and pistons or plungers 18 which telescope into forward ends of the cylinders and have fluid tight engagement with inner walls thereof. The rear ends of the cylinders 17 are pivoted at 19 on aligned transverse axes to the outer ends of the lower cross member 7 so that the booms as a whole may oscillate freely in vertical longitudinal planes alongside the tractor.

The forward ends of the plungers 18 are rigidly connected by a cross bar 20 and skids or shoes 21 are secured to these forward ends to run upon the ground, the said skids of course being shaped to prevent their digging into the ground. The aforesaid connection of the forward ends of the booms will of course cause them to operate at all times in unison.

The carrier, sweep, or basket is designated generally at 22 and comprises a series of transversely spaced and longitudinally extended pickup rake fingers 23 which are secured at rear ends to spaced, transversely extended rigid cross members 24—24a. Forward ends of the fingers 23 are pointed and the length of the members 24—24a such that the width of the assembled rake member or basket will be substantially greater than the frame and tractor as clearly shown in Fig. 1. Rear uprights or posts 25 are secured to the rearmost cross member 24 and carry a series of rear cross pieces 26 while end pieces 27 are extended forwardly at the ends of the basket in order to prevent material from escaping at either the back or ends.

The basket is pivotally connected near its rear edge to forward ends of the booms 16 as designated at 28, said connections being made on transverse axis and by suitable bracket members 29 secured to the forward cross member 24a. The back and ends of the basket are braced and tied rigidly by angular braces 30 and upright bars 31 as clearly shown.

A radius or tie frame designated generally at 32 is provided and includes as its main elements a pair of radius bars 33 which are pivotally connected at their ends at 34 to the outer ends of the upper cross member 11 and to forward end portions of the plungers 18 so that these bars extend substantially in the same vertical and longitudinally extending planes as the booms 16. At their rear ends the radius bars 33 are welded or otherwise rigidly secured to gusset plates 35 which are in turn secured on sleeves 36 journaled on pins 37 welded or secured to the ends of the cross member 11 to form pivots on transverse axes for the bars. At forward ends the radius bars are similarly secured to gusset plates 38 which pivotally engage pins 39 disposed on transverse axes and carried in brackets 40 secured to the plungers 18.

A truss frame completes the radius frame structure and comprises inwardly or diagonally extending bars 41 which are secured to their ends to the gusset plates 35 and 39 and which at their inner ends are secured to a diagonally braced head frame member 42 as shown. This truss frame serves to impart extreme rigidity and strength to the radius assembly and prevents any possible distortion of the radius bars 33 themselves.

A pump 43 is mounted at the rear of the tractor A and is connected, as by a belt 44 and pulley 45 to the power take-off shaft I thereof. A supply tank 46 is mounted on one upright 10 and is filled with oil or other hydraulic fluid with a supply line 47 leading to the pump 43. The pressure line 48 from the pump leads to a valve housing 49 which is arranged upon a bracket 50 on the upright 10 and has one control handle 51 extending inwardly in position for convenient manipulation from the driver's seat H. The pump 43 is of course designed to take fluid from the tank 46 and supply the fluid under pressure to the valve for distribution thereby. Return from the valve to the tank 46 is through the return line 52.

One outlet of the valve controlled by handle 51 is connected by lines or hoses 53 to rear ends of the boom cylinders 17 as represented at 54 and the arrangement is such that, by manipulating the valve, the fluid may be admitted to these cylinders to exert a forward pressure on the pistons or plungers 18.

This pressure exerted upon the plungers 18 serves to urge them forwardly and greatly elongate the booms 16 and this thrust, exerted as it is upon the forward pivots 34 of the radius bars 33, causes the forward end of the booms to swing upwardly to a high elevation as shown in dotted lines in Fig. 2. The radius bars define the path of this movement and it will be apparent that the movement, either upwardly or downwardly, of the carrier 22 on the forward ends of the booms, may be readily controlled by proper manipulation of the valve 49 and control of the fluid admission to the booms. As the valve is opened to return the fluid to the tank 46 the weight of the parts is of course such as to return them automatically to their lowered positions. Obviously, too, the pressure may be controlled to support the carrier at any desired position above the ground.

The carrier or basket 22 is controlled as regards its tilting or angular positioning by means of a hydraulic cylinder 55 which is secured vertically to a center part of the upper cross member 11 and depends therefrom. A plunger 56 is slidable in the lower end of the cylinder 55 and in turn at its lower end slidably telescopes over a rigid upright guide rod 57 secured at 58 to the lower cross member 7. Another valve in the housing 49, controlled by the separate inwardly directed handle 59 is connected by a line or hose 60 to the upper end of the cylinder 55, and when this valve is opened fluid is admitted to the cylinder to urge the plunger 56 downwardly as will be apparent. In this movement the plunger is of course held in proper alignment by the cylinder and by guide rod 57.

The plunger 56 carries a sheave or pulley 61 near its lower end and a cable 62 is secured at 63 near the upper end of the cylinder 55, run down along one side thereof, trained beneath the pulley 61 and then run back up the other side and over a sheath or pulley 64 which is journaled on a transverse axis in a bracket 65 carried atop a cross bar 66 on the upper ends of the uprights 10. The cable is then directed forwardly and is forked for connection at forward ends 67 to transversely spaced uprights or posts 25 of the basket 22. It will be noted that the pulley 64 is well above the rear radius bar pivots 37 while the forward end connections 67 of the cable are well above both the forward radius bar pivots 40 and the basket pivots 28.

In operation the basket is supported near the ground with the fingers 23 forwardly directed to rake up the mown hay as the tractor travels forwardly over the ground. In this operation the skids 21 may ride the ground or may serve only as protection should the tractor strike uneven ground surfaces. The hay picked up by the fingers will build up on the basket and when it is full the basket may be raised by manipulating the valve handle 51 to admit fluid to the booms 16 as has been described. The tractor may then be driven to the stack or other place of deposit and the basket raised high over the stack as will be evident. During the raising operation the valve controlled by handle 59 may be manipulated to admit or release pressure from the tilting cylinder 55 and such operation, raising or lowering the pulley 61, will pull or release the cable 62. By this means the basket may be rocked on its pivots 28 to maintain it in a level position and prevent dropping the load, and as the stack is reached the pressure in cylinder 55 may be entirely released, whereupon the weight of the hay will tip the basket forwardly, allowing the load to slide off the fingers 23 as the tractor is backed away. The basket may then be tipped back to working position by again admitting the pressure to the tilting cylinder.

All of the foregoing operations are rapidly and conveniently carried out by the operator from his seat on the tractor, and the booms 16 may now be collapsed and the basket lowered to repeat the operation on the next load.

It will be noted that the cable 62 lying substantially parallel with the radius bars 33 will have a parallel leverage action such as to substantially hold the basket in its horizontal position as it is raised and lowered thus requiring very little manipulation of the tilting valve and cylinder. It is contemplated that the weight of the basket and load as distributed forwardly of the pivots 28 will be sufficient at all times to raise the plunger 56 when fluid pressure thereabove is released, but it is, of course, obvious that this action may be assisted by a spring if required.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. A tractor mounted loading implement, comprising a frame rigidly supported on the tractor, telescoping booms positioned at opposite sides of the tractor, the said booms being pivotally connected at rear ends to a rear lower portion of the frame for up and down movements at their forward ends alongside the tractor, load carrying means on the said forward ends of the booms, means for extending the booms lengthwise in a forward direction, radius bars pivotally connected at forward ends to the booms and at rear ends to an upper rear portion of the frame above the pivotal connections of the booms, the said radius bars being mounted for up and down swinging movements and operative to guide the ends of the booms upwardly in response to forward movement thereof, and a truss frame mounted above and connected between the ends of the radius bars to prevent distortion thereof.

2. A tractor mounted loading implement, comprising a frame rigidly supported on the tractor, a telescoping boom positioned at each side of the tractor, the said booms being pivotally connected at rear ends to a lower portion of the frame for up and down movements at their forward ends, load carrying means on the said forward ends of the booms, a fluid pump connected to the tractor and operated thereby, a fluid supply means, means for conducting fluid under pressure from the pump to the booms for projecting the forward ends thereof in a forward direction, and radius members connected between upper portions of the frames and the forward ends of the booms and operative to guide the booms upwardly as they are projected forwardly.

3. A loading implement comprising a frame, telescoping booms supported at rear ends on the frame for up and down swinging movements at their forward ends with respect thereto, means for extending the booms lengthwise, a radius member connected between the frame and booms for guiding the forward ends of the booms upwardly in response to said extension of the booms, a load carrying sweep pivotally mounted on the forward ends of the booms and tiltable forwardly and rearwardly thereon, and a cable connected between the frame and the sweep and extending substantially parallel throughout its length with respect to the radius member to thereby retain the sweep in adjusted position as it is raised and lowered.

4. A tractor mounted loading device, comprising a frame supported by the tractor, telescoping booms pivotally connected at rear ends to the frame and arranged for up and down swinging movements in substantially longitudinal planes, means for extending the booms lengthwise and forwardly, radius bars pivotally connected at rear ends to the frame above the rear ends of the booms and pivotally connected at forward ends to forward ends of the booms for guiding the same upwardly in an arcuate path as the booms are extended, a sweep pivotally supported on the forward ends of the booms for forward tilting movement, and a flexible member connected between the frame and sweep, the said flexible member being substantially parallel to and coextensive with the radius member to thereby retain the sweep in adjusted position as it is raised and lowered.

5. A tractor mounted loading device, comprising a frame supported by the tractor, telescoping booms pivotally connected at rear ends to the frame and arranged for up and down swinging movements in substantially longitudinal planes, means for extending the booms lengthwise and forwardly, radius members connected between the frame and the forward ends of the booms for guiding the booms upwardly as they are extended, a sweep pivotally supported on the forward ends of the booms for forward tilting movements with respect thereto, and skids carried on the lower side of the sweep for ground engagement in the lowered positions of the booms and sweep.

6. A tractor mounted loading device comprising a frame mounted on the tractor and having an upright portion supported rearwardly of the tractor, booms arranged alongside the tractor and each comprising front and rear sections slidably connected for relative endwise movements, said rear sections being pivoted at rear ends to the frame and supporting the booms for up and down swinging movements alongside the tractor, the forward sections extending at forward ends ahead of the tractor, a load carrying device on said forward ends of the booms ahead of the tractor, radius members pivotally connected at rear ends to the upright frame portion above the rear ends of the booms and extending forwardly to points of pivotal connection with forward ends of the booms and being arranged for up and down movements in substantially the same plane as the booms alongside the tractor, and power actuated means for moving said forward sections of the booms lengthwise with respect to rear sections.

7. A tractor mounted loading device comprising a frame mounted on the tractor and having an upright portion supported rearwardly of the tractor, booms arranged alongside the tractor and each comprising front and rear sections slidably connected for relative endwise movements, said rear sections being pivoted at rear ends to the frame and supporting the booms for up and down swinging movements alongside the tractor, the forward sections extending at forward ends ahead of the tractor, a load carrying device on said forward ends of the booms ahead of the tractor, radius members pivotally connected at rear ends to the upright frame portion above the rear ends of the booms and extending forwardly to points of pivotal connection with forward ends of the booms and being arranged for up and down movements alongside the tractor, bracing means for the radius members comprising bars connected at their ends to the respective ends of the radius members and arched upwardly intermediate their ends, the forward brace bars being spaced apart and diverging toward forward ends to thereby clear the tractor and clear the forward view of the tractor operator, and power actuated means for extending the booms lengthwise to thereby urge their forward ends upwardly with the load device.

8. A tractor mounted loading device, comprising a frame mounted in upright position at the rear of the tractor, a pair of telescoping extensible booms pivotally mounted at rear ends on the lower portion of the frame and extending forwardly therefrom alongside the tractor, radius bars pivotally connected at rear ends to the frame adjacent its upper end and at forward ends pivotally connected to forward ends of the booms to guide said forward ends upwardly as the booms are extended in a forward direction, power actuated means for extending the booms, a tiltable hay sweep mounted on forward ends of the booms, a cable connected to the sweep for tilting the same, said cable being connected at a forward end to the sweep, a hydraulic piston and cylinder mechanism mounted on the frame and connected to the rear end of the cable, a fluid pump operated by the tractor engine, and means for supplying fluid under pressure from the pump to the cylinder for tightening and loosening the said cable and thereby controlling the tilting action of the sweep.

9. A tractor mounted loading implement, comprising a frame connected to the tractor and having an upper portion extending above the tractor, members pivoted at rear ends to said upper portion of the frame and normally extending downwardly and forwardly therefrom, a sweep operatively connected to forward ends of said members, hydraulic cylinders connected between a lower portion of the frame and the said members forward of their rear end pivots, means for supplying fluid under pressure to the said cylinders for raising the forward ends of the said members and the sweep, the said sweep being tiltable with respect to the members, another hydraulic cylinder operatively connected to the sweep to tilt the same, and means for supplying fluid to said another cylinder independently of the fluid supply to the first mentioned cylinders.

10. A tractor mounted loading implement, comprising a frame connected to the tractor and having an upper portion extending above the tractor, members pivoted at rear ends to said upper portion of the frame and normally extending downwardly and forwardly therefrom, a sweep operatively connected to forward ends of said members, hydraulic cylinders connected between a lower portion of the frame and the said members forward of their rear end pivots, means for supplying fluid under pressure to the said cylinders for raising the forward ends of the said members and the sweep, the said sweep being tiltable with respect to the members, a sweep tilting hydraulic cylinder supported on the frame, cable connections between the latter cylinder and sweep, and means for supplying fluid to said sweep tilting cylinder for actuating the cables and tilting the sweep.

11. A tractor mounted loading device, comprising a frame operatively arranged for transport by the tractor, said frame having a lower portion extruding at the sides of the tractor and an upper portion extending above and crosswise with respect to the tractor, members pivotally connected at rear ends to said upper frame portion and extending forwardly therefrom, a load carrying device operatively and adjustably connected to forward ends of said members, hydraulic cylinder and plunger units supportably connected to the lower portion of the frame at each side of the tractor and connected to said members to move said members in up and down planes, another hydraulic cylinder and plunger unit supported on the upper portion of the frame substantially at the center thereof, means connecting the said another cylinder and work holding device for adjusting said device, and means for supplying actuating fluid to the cylinder and plunger units.

12. A loading device comprising a wheel borne frame having an upright rear portion, booms arranged alongside the frame and each comprising front and rear sections slidably connected for relative endwise movements, said rear sections being pivoted at rear ends to the frame and supporting the booms for up and down swinging movements alongside the frame, the forward sections extending at forward ends ahead of the frame, means rigidly connecting the said forward ends of the booms, at least one radius member pivotally connected at a rear end to the upright portion of the frame at a point above the rear end pivots of the booms and operatively connected at forward ends to the forward end portions of the booms to guide the said booms upwardly in response to endwise extension of the front and rear sections thereof, means for extending said boom sections, and a load carrying device operatively supported at the forward ends of the booms and radius members.

JOSEPH F. SCHWAN.